United States Patent [19]

Eftefield

[11] Patent Number: 5,511,868
[45] Date of Patent: Apr. 30, 1996

[54] BOOSTER RECOIL MECHANISM FOR ENDLESS TRACK MACHINE

[75] Inventor: Larry G. Eftefield, Edelstein, Ill.

[73] Assignee: Caterpillar Inc., Peoria, Ill.

[21] Appl. No.: 322,249

[22] Filed: Oct. 12, 1994

[51] Int. Cl.⁶ .................................................. B62D 55/30
[52] U.S. Cl. .............................. 305/31; 305/32; 267/175; 267/289
[58] Field of Search ............................ 305/10, 29, 31, 305/32; 180/9.1, 9.54, 9.56; 267/175, 177, 289

[56] References Cited

U.S. PATENT DOCUMENTS

| | | | |
|---|---|---|---|
| 1,460,771 | 7/1923 | Stoner | 267/289 |
| 2,157,711 | 5/1939 | Lamb | 180/9.56 |
| 2,284,821 | 6/1942 | Heaslet | 305/31 X |
| 2,506,360 | 5/1950 | Henning | 305/31 |
| 3,572,678 | 3/1971 | Jerz, Jr. | 267/289 X |
| 5,263,695 | 11/1993 | Bianchi | 267/289 X |

FOREIGN PATENT DOCUMENTS 156773   12/1980   Japan ......................... 305/31

*Primary Examiner*—Russell D. Stormer
*Attorney, Agent, or Firm*—Pankaj M. Khosla

[57] ABSTRACT

A recoil mechanism of an endless track of a material working machine has first and second springs of differing compression rates. After loads of impact are absorbed by compression of one of the springs, the load is shared by the other spring and a hydraulic cylinder.

7 Claims, 4 Drawing Sheets

Fig_4_
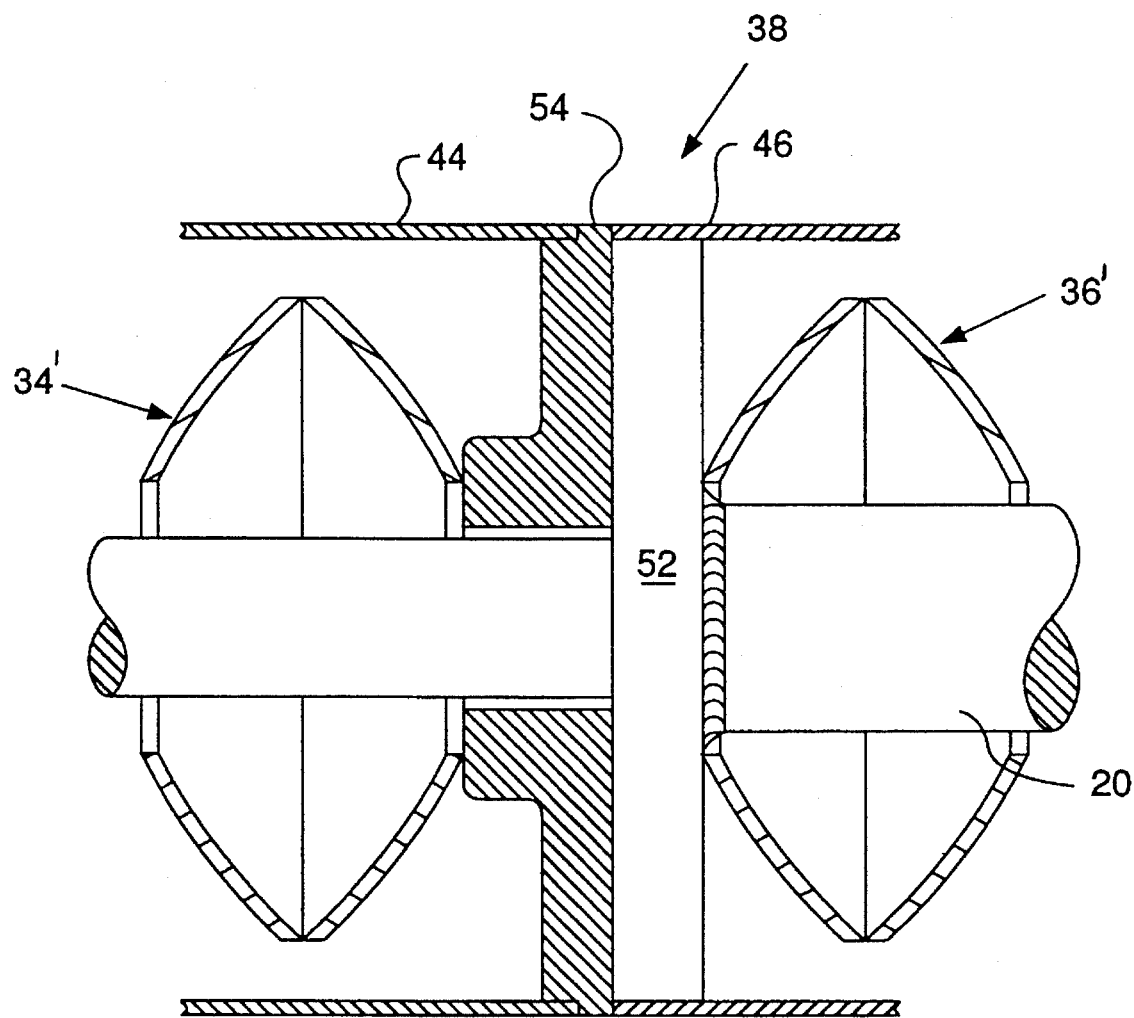

5,511,868

BOOSTER RECOIL MECHANISM FOR ENDLESS TRACK MACHINE

TECHNICAL FIELD

The present invention relates to a booster recoil mechanism for an endless track machine such as a crawler earthworking machine.

BACKGROUND ART

In heretofore utilized recoil mechanisms for endless track machines, the mechanism was often bulky, consumed a great deal of space and was of complex construction. In various material working machines, such as utilized in underground mines for example, the equipment must be compact in order to negotiate the relatively narrow and low passageways of the mines. There is also a problem of undesirable weight that is solved by the construction of compact machines. This is particularly true in earth working machines and trailers which are used in agricultural fields which are detrimentally affected by heavy ground pressure. The present invention is directed to overcome one or more of the problems as set forth above.

DISCLOSURE OF THE INVENTION

In one aspect of the invention, a recoil mechanism is provided for an endless track of a material working machine. The machine has a frame and a moveable track engaging wheel. A connecting member is attachable to the track engaging wheel. A hydraulic cylinder has first and second end portions. The first end portion is connectable to the machine frame.

A longitudinally extending recoil frame has first and second end portions and a middle portion. The first end portion is connectable to the second end portion of the hydraulic cylinder and the second end portion is attachable to the connecting member. The first and second end portions have threads formed thereon and the middle portion has a flange connected thereto.

A first spring has a first compression rate and is positioned about the first end portion of the recoil frame. A second spring has a second compression rate different from the compression rate of the first spring. The second spring is positioned about the second end portion of the recoil frame.

A first moveable spring stop assembly is positioned at the middle portion of the recoil frame at a location between said first and second springs. A second moveable spring stop assembly has threads mateable with the threads of the recoil frame and is positioned at the first end portion of the recoil frame at a location between the hydraulic cylinder and the first spring. A third moveable spring stop assembly has threads mateable with threads of the recoil frame and is positioned on the second end portion of the recoil frame at a location between the connecting member and the second spring.

BRIEF DESCRIPTION OF THE DRAWINGS

FIG. 4 is an enlarged view of a portion of the second embodiment of this invention.

BEST MODE FOR CARRYING OUT THE INVENTION

Figure 1:
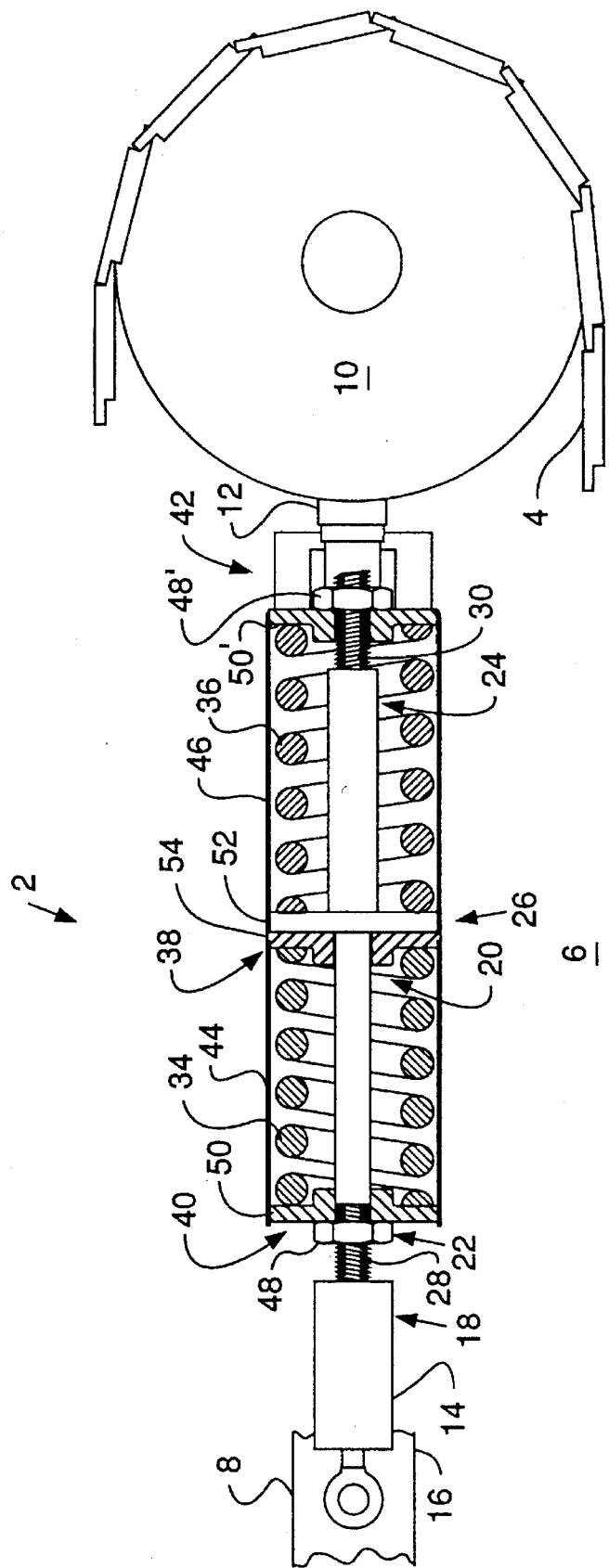
FIG. 1 is a diagrammatic view in partial section of the apparatus of the first embodiment of this invention.

Referring to the drawing, a recoil mechanism 2 is provided for an endless track 4 of a material working machine 6. The machine 6 can be, for example, an agricultural machine, a trailer, a mine working machine, a mobile crusher, a tunnel boring machine or a drill. The machine 6 has a frame 8 and a moveable track engaging wheel 10, such as a sprocket or idler, for example.

The recoil mechanism 2 has a connecting member that is attachable to the track engaging wheel 10. A hydraulic cylinder 14 has first and second end portions 16,18. The first end portion 16 of the hydraulic cylinder 14 is connectable to the machine frame 8.

A longitudinally extending recoil frame 20 has first and second end portions 22,24 and a middle portion 26. The recoil frame first end portion 22 is connectable to the second end portion 18 of the hydraulic cylinder 14. The second end portion 24 of the recoil frame 20 is connectable to the track engaging wheel connecting member 12.

The first and second end portions 22,24 of the recoil frame 20 have threads 28,30 formed thereon and the middle portion 26 has a flange 52 connected thereto.

A first spring 34 has a first compression rate and is positioned about the first end portion 22 of the recoil frame 20. A second spring 36 has a second compression rate different from the compression rate of the first spring 34. The second spring 36 is positioned about the second end portion 24 of the recoil frame 20.

A first moveable spring stop assembly 38 is positioned at the middle portion of the recoil frame 20 at a location between the first and second springs 34,36. The first spring stop assembly 38 is longitudinally, slidably moveable along the recoil frame 20.

A second moveable spring stop assembly 40 has threads mateable with the threads 28 of the recoil frame 20 and is positioned at the first end portion 22 10 of the recoil frame 20 at a location between the hydraulic cylinder 14 and the first spring 34. The second spring stop assembly 40 is longitudinally moveable along the recoil frame 20.

A third moveable spring stop assembly 42 has threads mateable with threads 30 of the recoil frame 20 and is positioned on the second end portion 24 of the recoil frame 20 at a location between the track engaging wheel connecting member 12 and the second spring 36. The third spring stop assembly 42 is longitudinally moveable along the recoil frame 20.

A first housing 44 preferably extends about and covers the first spring 34 and is connected to a spacer 54 that is slidably mounted on the recoil frame 20. A second housing 46 extends about and covers the second spring 36 and is connected to the third spring stop assembly 42 and is moveable therewith.

In the preferred embodiment, the compression rate of the first spring 34 is greater than the compression rate of the second spring 36. A preferred example of the compression rates of the springs 34,36 when used on a mobil crusher is 10,000 lb./in. for the first spring 34 and 8,000 lb./in. for the second spring 36.

The second and third spring stop assemblies 40,42' each preferably include a nut 48,48' and a slidable peripheral flange 50,50'. The flanges 50,50' are preferable round and have a radius sufficient for engageable contact with the respective adjacent spring 34,36. The first spring stop assembly 38 includes a peripheral flange 52 fixed to the recoil frame 20 and contacting the slidable spacer 54 and spring 36. The spacer has a size or radius sufficient for engageable contact with the adjacent second spring 36 and a slidable spacer 54 having a size or radius sufficient for engageable contact with the first spring 34.

Figure 2:
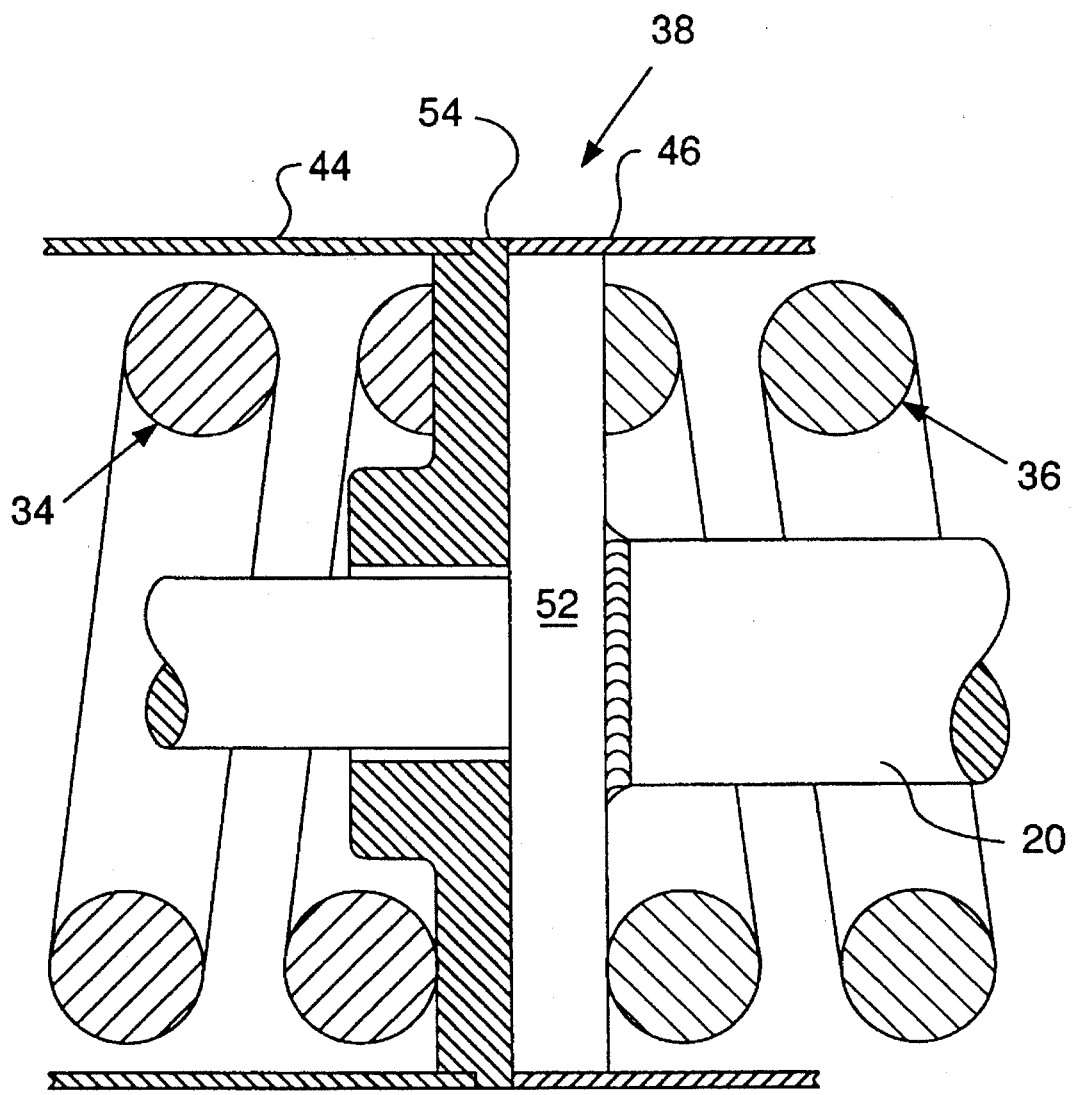
FIG. 2 is an enlarged view of a portion of the first embodiment of the invention.

Referring to FIG. 2, the spacer 54 is connected to the first housing 44 and is caused to slide toward the cylinder 14 and compress the first spring 34 in response to engagement by and movement of the second housing 46 toward the cylinder 14. The flange 52 and the spacer 54 are preferably of round configuration.

It is preferred that the diameter of the first and second springs 34,36 be as small as possible for the impact loads expected to be encountered and the outside diameters of the springs be substantially of equal dimensions in order to save materials, time, labor and natural resources.

Figure 3:
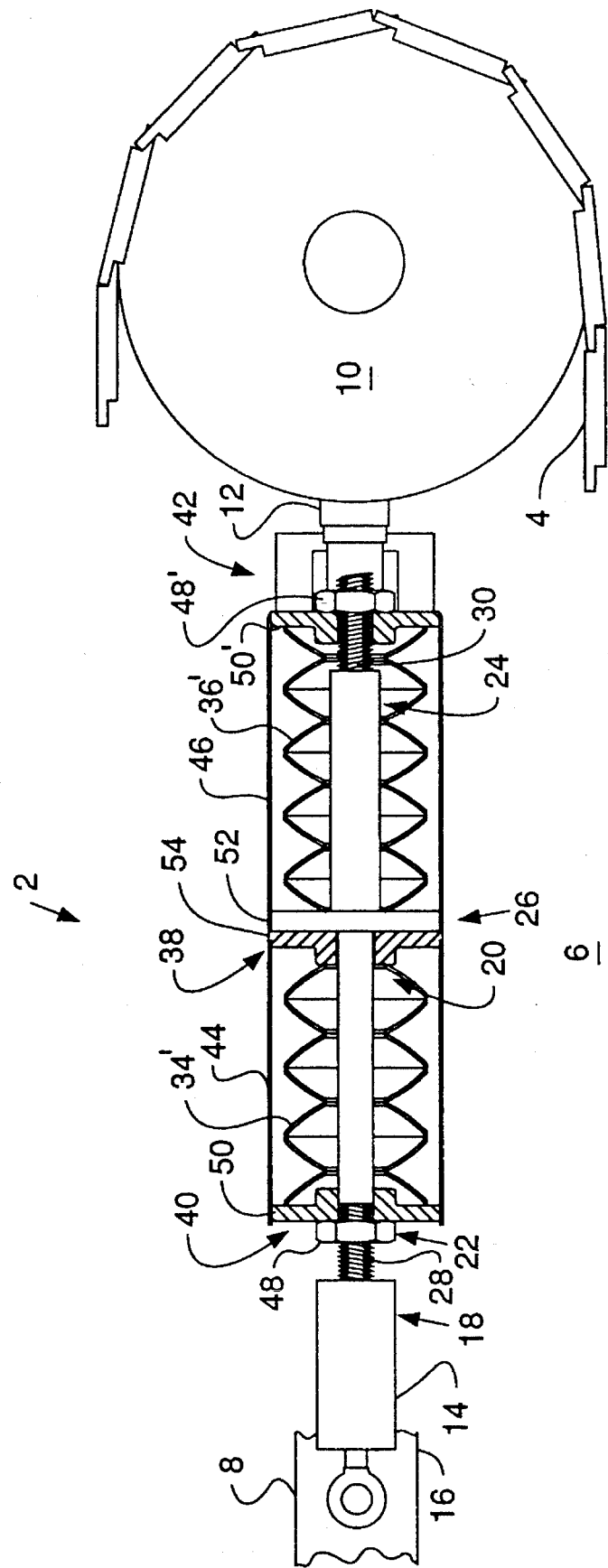
FIG. 3 is a diagrammatic view in partial section of the apparatus of the second embodiment of this invention.

It is also preferred that at least one of the springs 34/36 is a helical spring, more preferably, both of the springs are helical springs. It should be understood however that a Bellville spring can be used for one or both of the springs 34,36 without departing from this invention. Referring to FIGS. 1 an 2, the helical springs 34,36 are shown in partial section of the apparatus of the first embodiment of this invention. Referring to FIG. 3 and 4, the Bellville springs 34', 36' are shown in partial section of the apparatus of the second embodiment of this invention.

INDUSTRIAL APPLICABILITY

In the operation of this invention, large impact forces placed on the track 4 and directed toward the wheel 10 are absorbed by the springs 34,36 and further keep tension on the belt during bounce back from such impacts. The second spring 36 absorbs most of the commonly experienced forces or impacts. However, under severe impacts, the second spring 36 is compressed to a magnitude that the first spring 34 begins being compressed by movement of the second housing 46 against spacer 54. The loads on the springs are directed through the slidable portions of the spring stop assemblies 38,40,42. The nuts 48,48' can be adjusted to preload the springs 34,36 under static conditions. The hydraulic cylinder is provided as an additional preloading element and for also absorbing shock loads that would otherwise be transmitted to the frame 8 of the machine 6.

By the construction of this invention, one skilled in the art can easily control the force expected to be commonly encountered and provide for the larger forces by selection of the spring rates of the first and second springs 34,36. This selection can be easily made by one skilled in the art without undue experimentation.

Other aspects, objects and advantages of this invention can be obtained from a study of the drawing, the disclosure and the appended claims.

What is claimed is:

1. A recoil mechanism for an endless track of a material working machine having a frame and a moveable track engaging wheel, comprising:

a connecting member attachable to the track engaging wheel;

a hydraulic cylinder having first and second end portions, said first end portion being connectable to the machine frame;

a longitudinally extending recoil frame having first and second end portions and a middle, portion, said first end portion being connectable to the second end portion of the hydraulic cylinder and the second end portion being attachable to the connecting member, said first and second end portions having threads formed thereon and said middle portion having a flange connected thereto;

a first spring having a first compression rate and being positioned about the first end portion of the recoil frame;

a second spring having a second compression rate different from the compression rate of the first spring, said second spring being positioned about the second end portion of the recoil frame;

a first moveable spring stop assembly positioned at the middle portion of the recoil frame at a location between said middle portion flange and said first spring;

a second moveable spring stop assembly positioned at the first end portion of the recoil frame at a location between the hydraulic cylinder the first spring and in contact with said first spring;

a third moveable spring stop assembly positioned on the second end portion of the recoil frame at a location between the connecting member and the second spring and in contact with said second spring;

a first housing extending about and covering the first spring and being connected to the first spring stop assembly; and a second housing extending about and covering the second spring, being connected to the third spring stop assembly, and moveable into contact with the first spring stop assembly.

2. An apparatus, as set forth in claim 1, wherein the compression rate of the first spring is greater than the compression rate of the second spring.

3. An apparatus, as set forth in claim 1, including first and second nuts having threads mateable with the threads of the recoil frame and being positioned on the first and second respective ends of the recoil frame and contacting a portion of the respective second and third spring stop assemblies and wherein the second and third spring stop assemblies each include a slidable, peripheral flange each having a radius sufficient for engageable contact with their respective adjacent spring.

4. An apparatus, as set forth in claim 1, wherein the first spring stop assembly includes a peripheral flange connected to the recoil frame and a slidable spacer element having a size sufficient for engageable contact with the second housing and being connected to the first housing.

5. An apparatus, as set forth in claim 1, wherein at least one of the first and second springs is a helical spring and the other spring is a Bellville type spring.

6. An apparatus, as set forth in claim 1, wherein the first and second springs are helical springs.

7. An apparatus, as set forth in claim 1, wherein the first and second springs are Bellville type springs.

* * * * *